April 5, 1966 — A. C. LIND ETAL — 3,244,280
AERATED GRIT CHAMBER

Filed Sept. 9, 1963 — 2 Sheets-Sheet 1

April 5, 1966 A. C. LIND ETAL 3,244,280
AERATED GRIT CHAMBER
Filed Sept. 9, 1963 2 Sheets-Sheet 2

3,244,280
AERATED GRIT CHAMBER
Arthur C. Lind, Wauwatosa, and William J. Katz, Fox Point, Wis., and John L. Mancini, Des Plaines, Ill., assignors to Rex Chainbelt Inc., a corporation of Wisconsin
Filed Sept. 9, 1963, Ser. No. 307,617
8 Claims. (Cl. 210—66)

This invention relates to apparatus and a method for treating raw sewage as it is received by a sewage treatment plant and in particular provides for the improved classification and removal of the sand and grit.

The removal of grit of at least up to sixty or seventy mesh is generally desirable to prevent damage to the pumps and equipment of the plant and to prevent clogging of the piping and conduits at low flows through the plant. The removal of the sand and grit provided by the apparatus and method of the present invention includes removal of practically all of the heavy grit up to sixty mesh and more of the finer grit over sixty mesh than is presently possible. Also, and just as importantly, the grit removed is of a better quality in that less putrescible organic matter is included therewith. Grit with more than four percent organic matter is generally considered unsuitable for use and disposal as land fill without further washing or treatment.

This application is a continuation-in-part of the co-pending application Serial No. 158,034 filed December 8, 1961 now Patent No. 3,215,276 by the present inventors and entitled, "Adjustable Baffle Grit Chamber." The application referred to relates to aerated grit chambers wherein the grit is allowed to settle on a relatively flat floor and a circulatory current is maintained in the tank by the release of air from headers located just above the trough into which the grit is transported by the current or circulatory motion maintained within the tank by the air.

According to the invention of said application, a baffle is disposed in the chamber so that defined restrictions in effect between the top and bottom of the baffle to the water surface and the floor, respectively, provide controlled velocities at the water surface and over the floor of the tank. The velocity across the chamber above the baffle is the less critical, but provides a current at the water surface which reaches adequately across the tank. This current follows the wall of the tank and enters the zone of influence of the restriction below the baffle so that a continuous sweep of the floor of the chamber is effected by a current having the desired and selected velocity.

The grit chamber of the present invention includes an open, central trough which is disposed between two relatively steep slopes extending downwardly toward the trough from the two sides of the chamber. The trough and slopes extend the length of the chamber and the flow through the chamber and water level therein are regulated by an overflow weir at the outlet end of the chamber. The release of air effects a general circulatory current which is normal to the flow through the chamber. For convenience, the upward flow may be described as being behind the baffle and the downward flow as being in front of the baffle.

The combined velocity directions of the flow through the chamber and the circulatory current provide a resultant spiral flow which includes a diagonal cross-current over the grit receiving trough. The baffle is located along one side of the trough and the air is released from submerged headers located alongside the wall of the chamber behind the baffle. The restriction between the baffle and the slope partially controls or regulates the diagonal cross-current velocity over the trough and provides a diagonal upward sweep over the slope behind the baffle. The slope behind the baffle is, in effect, a target for the lighter grit which is scoured on the slope. For that purpose the slope is necessarily of a given slope so that unscoured grit does not accumulate to any appreciable depth on the slope.

The circulatory velocity may be gradually reduced toward the outlet end of the chamber where the flow approaches the outlet weir and carries only the finer grit. The graduated reduction is readily provided such as by the increased spacing of the outlets for the air.

The grit which should settle but requires scouring because of the organic matter adhering thereto is carried across the trough at the velocity provided for because the grit is "lightened" by the organic matter. After scouring, the settling velocity of the grit is increased and the scoured grit then settles and slides down the slope by gravity into the trough.

The principal object of the invention is to provide improved grit quality and a more efficient and maintenance-free grit removal means for sewage treatment plants.

More specifically, an object is to provide, for example, removal of better than ninety-five percent of the grit up to sixty mesh received with the sewage flow with considerably less than four percent organic material included therewith.

Another more specific object is to provide an aerated grit chamber wherein the sand and grit is more evenly distributed over the length and width of the trough with no accumulations which may cause overloading of the mechanical equipment in the trough.

More specifically also, an object is to provide grit removal means having the same high efficiency between nominal and maximum flows.

The drawings furnished herewith illustrate the best mode of carrying out the invention as presently contemplated and set forth hereinafter.

Figure 1:
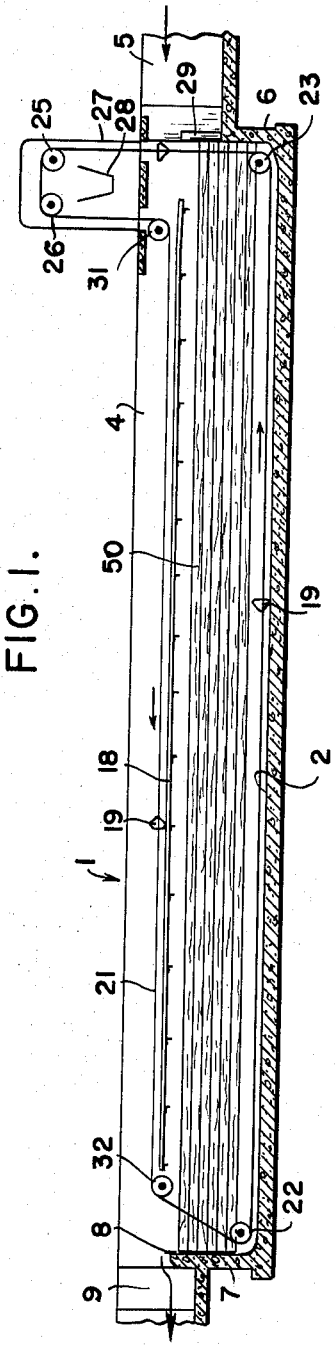
FIGURE 1 is a longitudinal vertical section of the grit chamber of the invention and of portions of the delivery and discharge channels connected to the inlet and outlet ends of the grit chamber. The chain and bucket grit collecting and removal means are shown diagrammatically.
Figure 3:
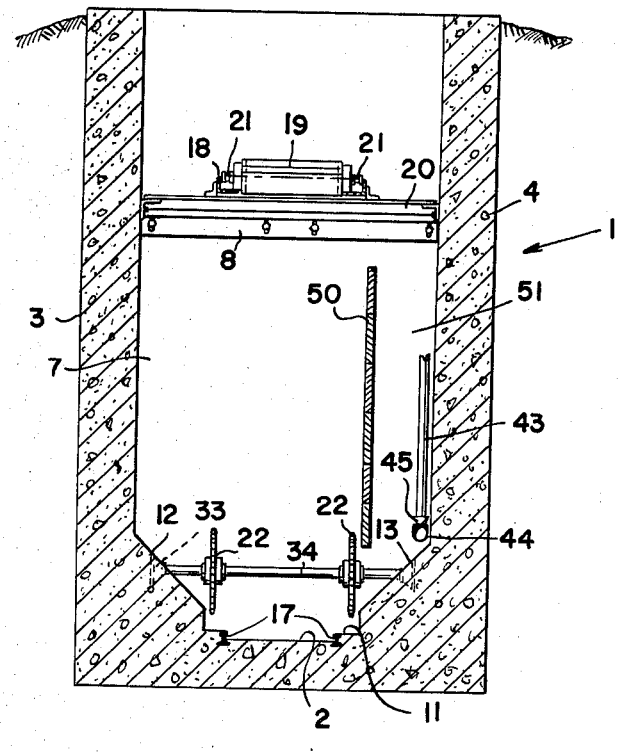
Figure 4:
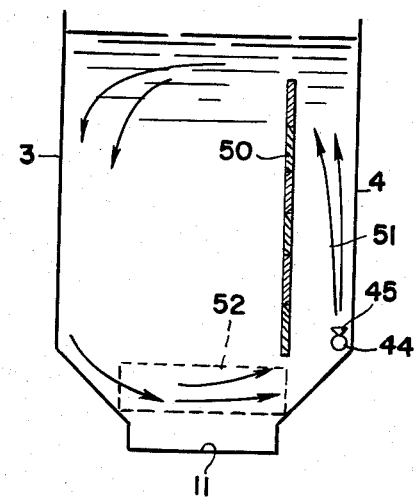

FIG. 3 is an enlarged vertical cross-section of the grit chamber shown in FIG. 1 taken at about the mid-length thereof. The chain and buckets in the grit receiving trough are not shown; and FIG. 4 shows the cross-section of the chamber in outline and wherein the circulatory current is illustrated by arrows. A separation zone over the grit receiving trough is shown in broken lines.

The chamber 1 shown in the drawings is of concrete construction and includes the floor 2 and side walls 3 and 4. Delivery channel 5 opens into chamber 1 over the inlet end wall 6. The outlet end wall 7 of chamber 1 is provided with the weir 8 which maintains a given liquid level within the chamber. The flow over weir 8 passes into discharge channel 9 and is generally delivered directly to the clarifiers, not shown, of the sewage treatmentment plant for primary treatment.

The shallow grit collecting trough 11 in floor 2 extends between end walls 6 and 7 of chamber 1. The parts of floor 2 on each side of trough 11 form the slopes 12 and 13 respectively extending downwardly from walls 2 and 3 to trough 11 and having an angle as shown of forty-five degrees. The inclination of slope 13 is critical although the inclination might be somewhat more or less than that shown. The inclination of slope 12 is much less critical and an inclination identical to that of slope 13 is primarily a matter of convenience in the design and construction of the chamber.

The rails 17 set in the floor 2 of chamber 1 and rails 18 above the liquid level provide for the support of the buckets 19. Rails 18 are carried by the cross-members 20 having ends fixed to side walls 2 and 3. The ends of buckets 19 are respectively connected at corresponding intervals to the parallel chains 21 which operate over pairs of sprockets shown diagrammatically in FIG. 1.

The lower run of chains 21 from sprockets 22 at outlet end wall 7 of chamber 1 to sprockets 23 at inlet end wall 6 of chamber 1 provides for movement of buckets 19 on rails 17 and collection of the grit in trough 11. The buckets 11 with the grit are lifted from the inlet end of chamber 1 and then transported horizontally over sprockets 25 and 26 in housing 27 above chamber 1 to discharge the grit into the receiving trough 28. The flow-dividing column 29 in channel 5 shown immediately above wall 6 of chamber 1 prevents the flow from washing the grit from the bukckets moving from sprockets 23 to sprockets 25.

The return run of chains 21 from sprockets 31 to sprockets 32 moves the buckets on rails 18 to the outlet end of chamber 1. Sprockets 26 are generally driven and sprockets 32 are generally movable for taking up excess slack in the chains. Each pair of sprockets is mounted on a single shaft having ends supported in bearings such as bearings 33 supporting shaft 34 carrying sprockets 22 as shown in FIG. 3.

Figure 2:
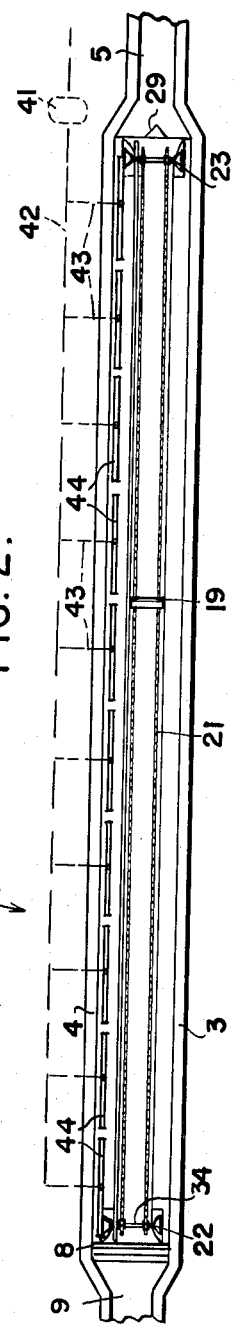
FIG. 2 is a plan view of the grit chamber shown in FIG. 1. A part of the air supply is shown diagrammatically.

The air supply pump 41 shown diagrammatically in FIG. 2 is connected to the distribution line 42 extending the length of chamber 1 above wall 3 and the vertical pipes 43 from line 42 carry the series of headers 44. Headers 44 are located alongside wall 3 and immediately above slope 13 and are provided with a sereis of outlets which may comprise spaced openings, not shown, in the top of headers 44 or the fittings 45 having a multiplicity of openings.

Baffle 50 extending the length of chamber 1 is spaced from wall 3 to provide the classification zone 51 behind the baffle and above slope 13. The upward current in zone 51 is maintained by the air bubbles released from outlets 45 and rising to the surface of the flow through the tank.

The wetted cross-section of the chamber should be approximately square and the trough should be at least one-fifth or about one-third the width of the chamber. Accordingly, both slopes 12 and 13 are provided as required for a well-defined horizontal sweep or separation current over trough 11.

The rectangle 52 shown in outline with broken lines indicates generally the zone to which the diagonal cross-current is generally confined.

Baffle 50 is located over slope 13 so that the width of zone 21 is approximately one-fourth the width of the chamber. In smaller chambers of two or three feet in width, for example, the ratio may be slightly less and slightly more in chambers of eight or nine feet in width, for example.

In the operation of chamber 1, any material settling on slope 12 is, of course, carried almost directly into trough 11 by the circulation of the flow. The material on slope 13, however, is partially carried with the flow through the chamber and slides down slope 13 into trough 11 less directly as described.

The sand entering chamber 1 generally settles out within the first several feet of the chamber and directly into trough 11 or on slopes 12 and 13 and should have no tendency to remain on slope 13.

In carrying out the present invention the velocity of the separation current across trough 11 in zone 52 as indicated must be horizontal so that within the relatively short length of the current, the necessary spatial differentiation is provided between the grit which should settle and the grit of the same mesh which is slightly lighter because of the organic matter adhering thereto. The latter grit is carried across trough 11 and some of said latter grit in the slower-moving flow boundary adjoining slope 13 will settle directly thereon. The greater part of the said latter grit is carried up into zone 51 where the turbulence created by the release of air and the sweep of the water past the grit tending to remain suspended in zone 51 washes or scours the organic matter from the grit. Such cleaned grit then has an increased settling velocity which causes the grit to move downwardly in zone 51 and generally settles on slope 13 and is then scoured by the rolling action of the upward sweep and the flow through chamber which further frees the grit of most of the remaining organic matter. The grit collected in trough 11 is also washed and cleaned by the separation current which is continuously flowing over the trough. The organic matter, of course, is resuspended and passed through chamber 1 and the cleaned grit is generally transported on slope 13 with the flow.

Where the circulatory velocity diminishes toward the outlet end of the chamber, the "lightened" grit in moving diagonally, as described, moves in the chamber into a slightly lower circulatory velocity so that in general somewhat more of the "lightened" grit is first settled on slope 13.

Grit chamber 1 thereby provides a surprisingly better quality of grit and also under storm flow conditions is more effective in keeping sand and grit from passing into the treatment plant.

None of the sand or heavy grit entering the chamber is allowed to collect on the floor of the chamber so that no overloading of the mechanical grit removal equipment occurs. That is, only the finer grit requiring scouring remains settled on slope 13 only for a limited length of time.

The restriction between baffle 50 and slope 13 will be necessarily determined by the general size and capacity of chamber 1. In a chamber of four feet in width a spacing of about three and one-half inches would be required. In a chamber of eight feet in width the spacing would be about fourteen inches. The general dimensions of trough 11 as indicated thus determine the spacing of slopes 12 and 13 and the width of zone 52.

The generally optimum velocity of the diagonal cross-current over trough 11 in zone 52 in the range of 0.5 to 1.0 feet per minute is readily provided according to the invention. While the selected velocity increases with an increase in the velocity of the flow through the chamber, the current also has a more diagonal direction and the effective width of zone 52 or distance travelled between slopes 12 and 13 is similarly increased so that consistent and uniform classification of the grit and organic matter is provided irrespective of the rate of flow through the chamber.

Various embodiments of the invention may be employed within the scope of the accompanying claims.

We claim:
1. Separation and collection means for the removal of grit from raw sewage with a minimum of organic matter with the removed grit, comprising an elongated chamber having side walls and a floor having a shallow central trough and slopes from each side wall extending downwardly to the trough at approximately forty-five degrees, said trough being between one-fifth and one-third the width of the chamber, a conveyor operating in said trough and upwardly therefrom at one end of the chamber for removal of the grit, an inlet opening into said one end of the chamber on at least one side of the part of said conveyor operating upwardly from the chamber, the other end of said chamber having an outlet with an overflow weir which maintains a water level with the chamber approximately equal to said width of the chamber, said inlet and outlet providing a longitudinal flow through said elongated chamber, air supply means having a series of outlets along one wall of said chamber and immediately above the adjoining slope of the chamber floor, and a vertical baffle spaced above said adjoining slope and below said water level and extending the length of the chamber, said one wall and the side of said baffle facing said one wall defining a classification zone and said air supply means providing an upward movement of the flow in said zone and the circulation of the sewage in the chamber in a direction normal to the flow through the chamber which circulation includes a downward sweep along the other wall and other slope and which sweep continues horizontally over the trough at a controlled velocity providing classification of the suspended matter so that the heavier and cleaner grit settles in the trough and the other material is carried to said adjoining slope where further grit settles and moves downwardly thereon, said circulation further including an upward sweep over said adjoining slope for cleaning of the further grit settling and moving downwardly thereon.

2. The method of separating the grit from sewage and treating the grit for removal which method comprises passing the sewage in a longitudinal flow through a relatively long chamber having an approximately square wetted cross-section and a central grit receiving trough between two slopes on which the grit can settle, and circulating the sewage in a second flow around the periphery of the chamber and normal to the longitudinal flow at a velocity effecting scouring of the grit which tends to settle on the slope over which the circulating second flow is upward.

3. The method of separating the grit from sewage and treating the grit for removal which method comprises passing the sewage in a longitudinal flow through a relatively long chamber having an aproximately square wetted cross-section and a central grit receiving trough between two slopes on which the grit can settle, circulating the sewage in a second flow around the periphery of the chamber and normal to the longitudinal flow, and effecting scouring of the grit which tends to settle on the slope over which the circulating second flow is upward by restricting the circulating second flow over said slope and increasing the velocity thereof to prevent accumulations of grit on said slope.

4. An aerated grit chamber having an inlet end and an opposite outlet end with a weir regulating a longitudinal flow of water through the chamber while maintaining a given water level therein, said chamber having side walls and a bottom defining a shallow grit receiving trough and a steep slope from each side wall downwardly to the trough, air supply means having a series of outlets alongside one of the side walls and above the adjoining slope, said means providing a cross-circulation of the flow through the chamber, the combined longitudinal flow through the chamber and said cross-circulation of the flow defining a diagonal current over said trough and upward over said adjoining slope, and a vertical baffle extending the length of the chamber and located over said adjoining slope to define a classification zone between the baffle and said one wall, the top and bottom of said baffle being spaced respectively from said water level and adjoining slope so as to restrict the cross-circulation referred to and in particular the diagonal current over said trough to provide a uniform cross-flow velocity in the order of 0.5 to 1.0 feet per second and a controlled velocity upwardly over said adjoining slope to effect scouring of the grit settling thereon.

5. Classification and scouring means for the removal of grit from raw sewage with a minimum of organic matter with the removed grit, comprising an elongated chamber having side walls and a floor having a shallow central trough and slopes from each side wall extending downwardly to the trough at approximately forty-five degrees, said trough being between one-fifth and one-third the width of the chamber, a conveyor operating in said trough and upwardly therefrom at one end of the chamber for removal of the grit, an inlet opening into said one end of the chamber on at least one side of the part of said conveyor operating upwardly from the chamber, the other end of said chamber having an outlet with an overflow weir disposed to maintain a water level with the chamber, said inlet and outlet providing a longitudinal flow through said elongated chamber, approximately equal to said width of the chamber, air supply means having a series of outlets along one wall of said chamber and immediately above the adjoining slope of the chamber floor, and a vertical baffle spaced above said adjoining slope and below said water level and extending the length of the chamber, said one wall and the side of said baffle facing said one wall defining a classification zone and said air supply means providing an upward movement of the flow in said zone and the circulation of the sewage in the chamber in a direction normal to the flow through the chamber, said circulation combined with the flow through the chamber including a diagonal sweep extending horizontally over the trough and upwardly over said adjoining slope, the spacing of said baffle from said adjoining slope being less than one-half the distance between the baffle and said one wall and effectively regulating said sweep over the trough and baffle to provide the velocity which is just sufficient to carry settleable grit with organic matter over the trough to said adjoining slope and to scour the grit settling on said adjoining slope of organic matter for resuspension and passing through the chamber.

6. In an aerated grit chamber having a bottom and side walls and means regulating a flow of liquid therethrough to maintain a given liquid level therein, said chamber having a series of air outlets alongside one wall, said bottom having a central lengthwise trough and downward slopes from each wall to said trough for collection of grit in the trough, a baffle above the slope adjoining said one wall and spaced from said one wall a distance between one-third and one-fifth the width of the chamber, and the bottom and top of said baffle being spaced from said last named slope and liquid level a distance less than one-half said distance to said one wall, and air supply means connected to said outlet having a capacity providing cross-circulation of the flow through the chamber which circulation includes a diagonal sweep over said trough at a velocity in the order of one foot per second or less which velocity allows clean disposable grit to settle in said trough and carries the grit lightened by adhering organic matter across the trough for scouring on said last named slope.

7. In an aerated grit chamber having a bottom and side walls and means regulating a flow of liquid therethrough to maintain a given liquid level therein, said chamber having a series of air outlets alongside one wall, said bottom having a central lengthwise trough and downward slopes from each wall to said trough for collection of grit in the trough a baffle above the slope adjoining said one wall and spaced from said one wall to define a classification zone having a width between one-third and one-fifth the width of the chamber, the bottom and top of said baffle being spaced from said last named slope and liquid level a distance less than one-half the width of said zone, and air supply means connected to said outlets having a capacity providing a cross-circulation of the flow through the chamber which circulation includes a diagonal sweep over said trough at a velocity in the order of one foot per second or slightly less which velocity allows clean disposeable grit to settle in said trough and carries the grit lightened by adhering organic matter across the trough for scouring on said last named slope and includes an upward flow in said classification zone having a velocity of about one-half foot per second or slightly greater for classification of the grid and organic matter to be recirculated.

8. In an aerated grit chamber having a bottom and side walls and overflow means regulating a flow of liquid therethrough to maintain a given liquid level therein, said chamber having a series of air outlets alongside one wall, said bottom having a central lengthwise trough and downward slopes from each wall to said trough for collection of grit in the trough, a baffle above the slope adjoining said one wall and spaced from said one wall a distance between one-third and one-fifth the width of the chamber to form a zone therebetween, the bottom and top of said baffle being spaced from said last named slope and liquid level a distance substantially less than said distance to said one wall, and air supply means connected to said outlets having a capacity providing circulation of the flow through the chamber which circulation includes an upward flow through said zone and a diagonal sweep over said trough at a velocity in the order of one foot per second or less which velocity allows clean disposable grit to settle in said trough and carries the grit lightened by adhering organic matter across the trough, the specified spacing of the baffle regulating the velocity of said circulation of the flow to provide that the grit which does not settle because of adhering organic matter tends to remain suspended in said zone between said one wall and baffle until the adhering matter is at least partially removed by the upward flow in said zone and then tends to settle to said last named slope where further removal of such adhering matter is effected as such grit is moved by the flow and by gravity to the trough.

References Cited by the Examiner

UNITED STATES PATENTS

| | | | |
|---|---|---|---|
| 1,937,434 | 11/1933 | Piatt | 210—14 |
| 2,024,345 | 12/1935 | Elrod | 210—220 X |
| 2,126,228 | 8/1938 | Streander | 210—220 |
| 2,148,751 | 3/1939 | Tolman | 210—73 X |
| 2,532,457 | 12/1950 | Morgan et al. | 210—526 X |
| 3,154,602 | 10/1964 | Geiger | 210—14 X |

FOREIGN PATENTS 429,809  3/1930  Germany.

REUBEN FRIEDMAN, *Primary Examiner.*

D. M. RIESS, *Assistant Examiner.*